(No Model.)　　　　　　　　　　　　　　　　5 Sheets—Sheet 1.
G. BEEKMAN.
REAPING OR MOWING MACHINE.
No. 490,781.　　　　　　　　　Patented Jan. 31, 1893.
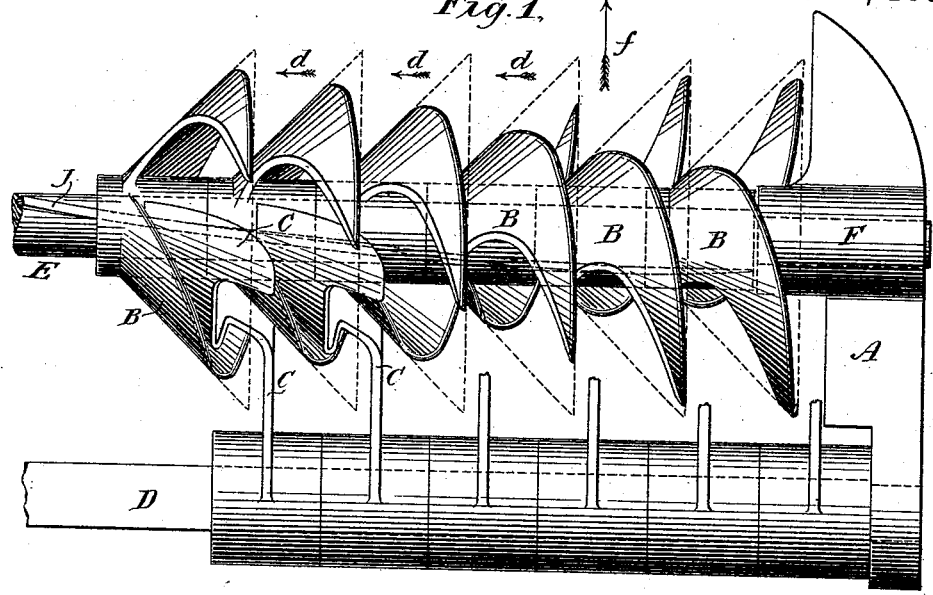
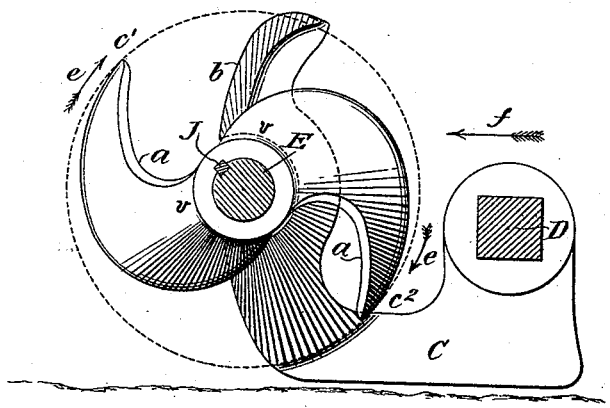
WITNESSES:　　　　　　　　　　　　　　　INVENTOR
Edward Thorpe　　　　　　　　　　　　　Gerard Beekman.
Eugene Lucas　　　　　　　　　　　　　　BY
　　　　　　　　　　　　　　　　　　　　Henry F. Parker.
　　　　　　　　　　　　　　　　　　　　　ATTORNEY

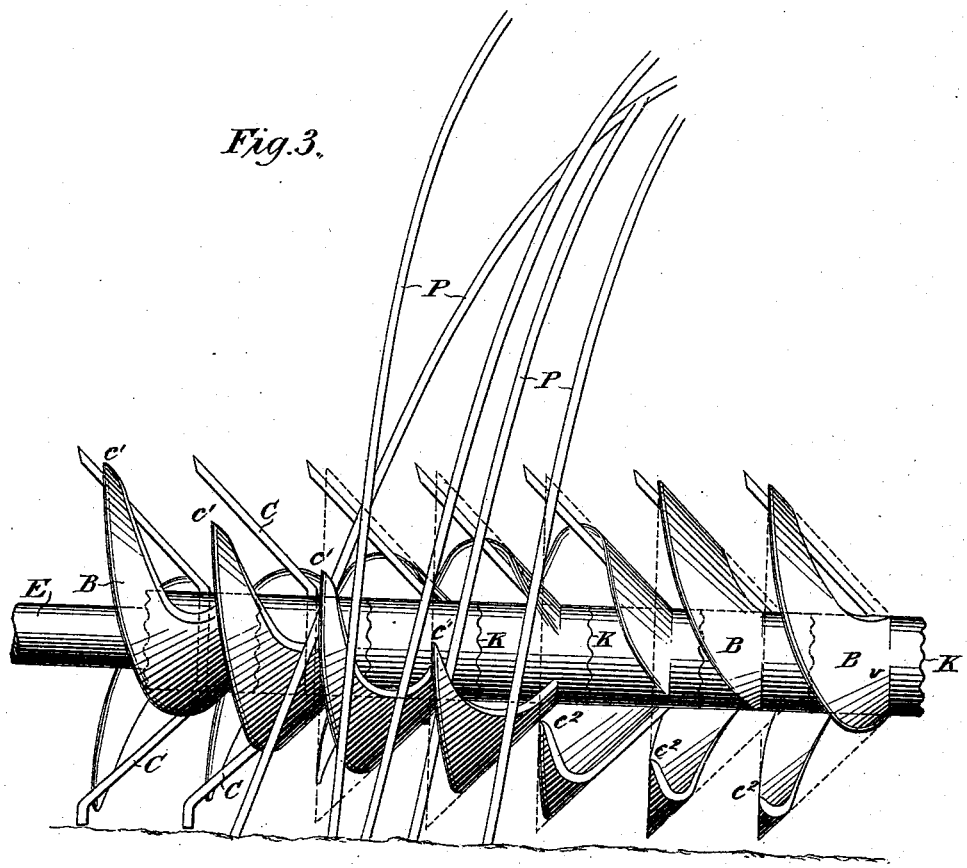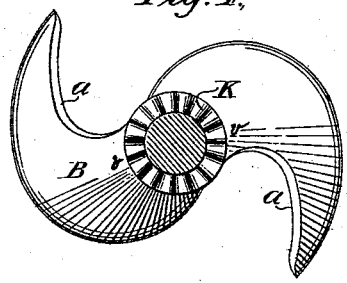

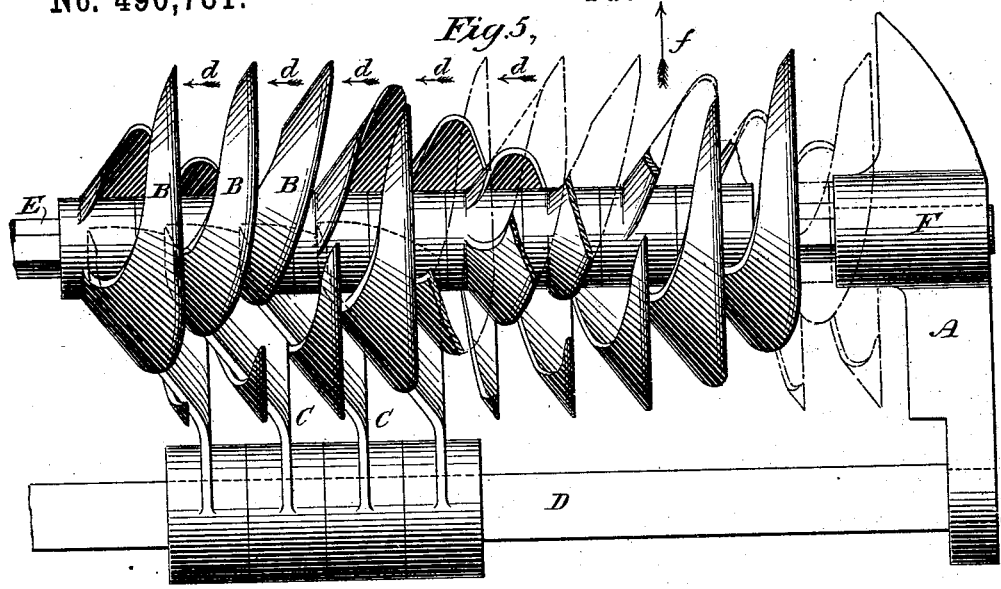
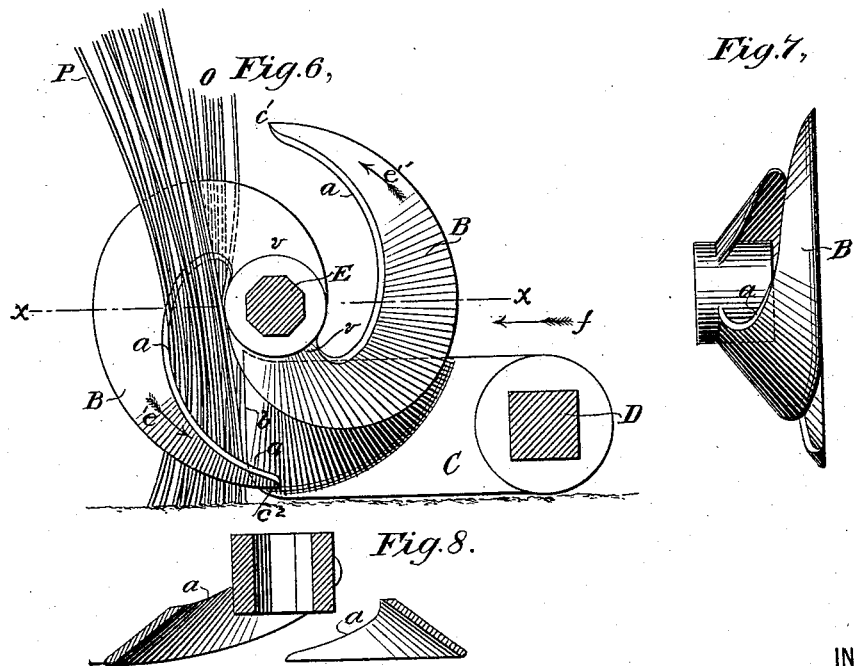

(No Model.)  5 Sheets—Sheet 4.
G. BEEKMAN.
REAPING OR MOWING MACHINE.
No. 490,781.  Patented Jan. 31, 1893.
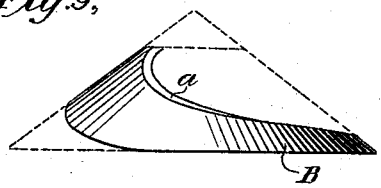
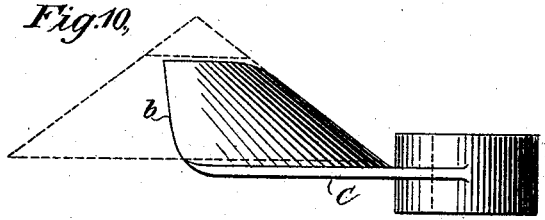
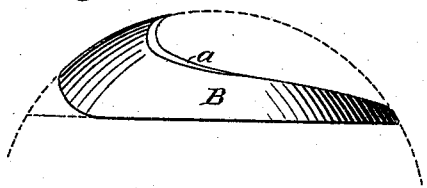
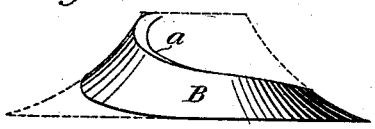
WITNESSES:
Edward Thorpe
Eugene Lucas
INVENTOR
Gerard Beekman
BY
Henry F. Parker
ATTORNEY (No Model.) 5 Sheets—Sheet 5.
G. BEEKMAN.
REAPING OR MOWING MACHINE.
No. 490,781. Patented Jan. 31, 1893.
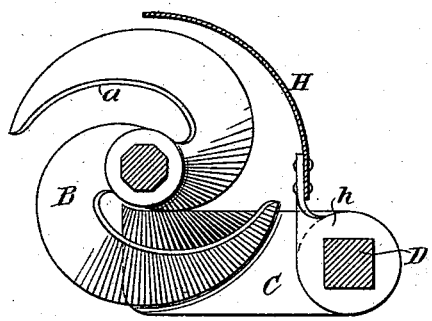
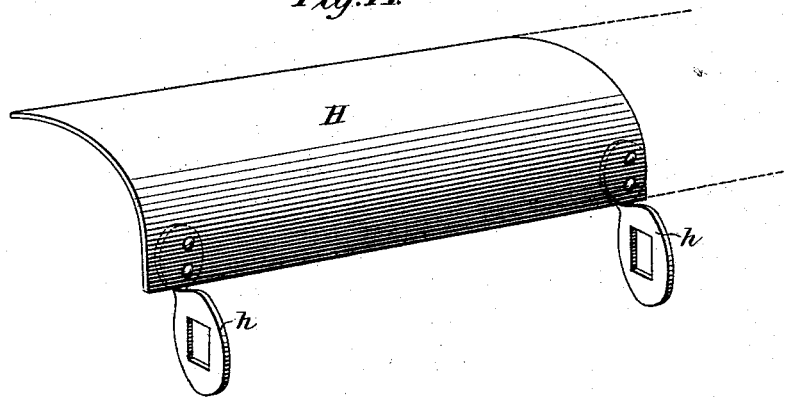

UNITED STATES PATENT OFFICE.

GERARD BEEKMAN, OF NEW YORK, N. Y.

REAPING OR MOWING MACHINE.

SPECIFICATION forming part of Letters Patent No. 490,781, dated January 31, 1893.

Application filed February 19, 1892. Serial No. 422,066. (No model.)

*To all whom it may concern:*

Be it known that I, GERARD BEEKMAN, a citizen of the United States, residing in the city, county, and State of New York, have invented certain new and useful Improvements in Reaping or Mowing Machines, of which the following is a specification.

My invention relates to that class of mowing machines having a cutter continuously revolving upon a horizontal axis, and the object of my invention is to adapt such character of cutter to harvesting grain or cutting tall grass.

My said invention consists in a series of conic cutters rotating in vertical planes and adapted when advanced through the grain to feed the same laterally from the conic surface of one cutter to the cutting edge of another.

Referring to the accompanying drawings in which similar letters of reference indicate corresponding parts throughout the several views: Figure 1, is a plan view showing the assembled cutters and adjacent parts; Fig. 2, an end view of one of the cutters and stationary knives; Fig. 3, a front elevation of the cutters acting on the grain; also showing a modification in the means for relative adjustment of the cutters; and Fig. 4, an end view of one of the cutters further showing said modification. Fig. 5, is a plan view showing assembled cutters adapted for an opposite direction of rotation from those in Fig. 1, and adjacent parts; Fig. 6, an end view of one of the cutters and stationary knives in Fig. 5; and Fig. 7, a side or edge view of Fig. 6. Fig. 8, is a sectional view of Fig 6, taken on the line $x—x$. Fig. 9, is a diagram illustrating a rotary cutter which describes a conic path. Fig. 10, is a diagram illustrating a stationary knife, lying in the conic path of the cutter in Fig. 5. Fig. 11, is a diagram illustrating a cutter describing a hemispherical path, which may be modified to describe a convex cone, or conicovate figure; and Fig. 12, is a diagram illustrating a rotary cutter describing a concave cone. Fig. 13, illustrates in end view a shield applicable to the cutters; and Fig. 14, a perspective view of the said shield detached.

A, indicates a portion, for instance, the outside shoe, of a suitable frame of the machine for moving the cutter over the ground.

E, is the rotary shaft bearing the revolving cutters B, said shaft having suitable bearings; one of which, F, is illustrated. The knives B, form scythe-like hooks having helical cutting edges $a$, on their inner sides.

D, is a non-rotary bar, bearing stationary knives C. The stationary knives C, have cutting edges $b$, that lie in the path of the orbit described by the edges $a$, of the rotary cutters B.

In order to attain conformity between the shearing edges of the rotary cutters and the stationary knives, the latter are located to occupy a position within the surface of an imaginary cone or other round figure described by the revolution of the former. Within the conic or equivalent figure described by the rotary knife, various forms of cutting edges may be devised, upon both the rotary and stationary knives, and I do not limit my invention to the specific forms illustrated. The contour of the rotary cutter, as viewed in the direction of its axis, and also the contour of the orbit described by such cutter, as viewed perpendicularly to its axis, may be greatly varied. For instance the cutting edge of the rotary cutter may extend radially from center to periphery; that is to say, so as to lie within a plane including the axis of rotation of the cutter. The contour of the stationary knives C, may also be varied within the surface of the conic or other imaginary figure within which they lie.

The rotary knife B, may for instance be constructed to lie within the surface of either a conic figure, as in Diagram 9, or a hemisphere, as in Diagram 11, or equivalent, such as a conicovate figure, or within the surface of a concave cone as in Diagram 12.

The stationary cutting knife C, as shown in Fig. 10, is constructed within the surface of the cone or other figure described by the rotary cutter B. The same characteristic applies to the stationary knife shown in Fig. 2.

I prefer to construct the rotary cutter as herein illustrated with a helical cutting edge lying in the surface of a cone or substantially equivalent figure, in order to acquire thereby a means of feeding the grain laterally from the back of one rotary cutter into the extremity or hook of a successive rotary cutter in the direction of the arrows d, in Figs. 1, and 5.

The extremities c', c², of the rotary cutters B, form hooks which gather the grain and hold it in suitable position for cutting as hereinafter more fully described. The rotary cutters B, may be composed of a double sickle as illustrated in the figures, or of a single one.

The rotary cutters B, are preferably arranged in a spiral succession along the shaft E, so that each cutting may occur in rythmical order as the shaft revolves, to distribute the resistance of moving as equally as possible throughout the entire revolution of the shaft, thus reducing the power required. The knives B, are all interchangeable, each one being a duplication of the other.

Various means may be employed to set the rotary cutters in the described successive positions. In Figs. 1 and 2, a spiral feather J, is shown, which fits key-ways in the hubs of the cutters all similarly located with reference to the blades B, thus establishing their relative succession about the shafts. In Figs. 3, and 4, the hubs of the cutters B, are faced with radial corrugations or teeth which interlock in the desired order when the cutters are assembled on the shaft E. In Figs. 5, to 8, inclusive, the shaft E, is polygonal in form, while the holes in the hubs of the rotary cutters correspond thereto and may be placed at progressive angles to one another in consecutive order as in Fig. 5. The stationary knives C, are also interchangeable, and are built up on the bar D, in a similar manner as are the cutters B, built up on the shaft E; thus any of the cutters B, or knives C, may be readily replaced when required.

In order to protect the operator from injury, in event of falling upon the knives, or for purposes of other protection, I may provide a suitable shield H, as indicated in Figs. 13, and 14. The grain is, in the construction thus described, permitted to enter between the cutters as far as necessary, for purposes of operation. The shield H, may be secured to the frame A, and bar D, in any suitable manner. Lugs h, are illustrated, attached to the shield H, which are adapted to be inserted between the hubs of the knives C, upon the bar D, at suitable intervals.

In operation, the shaft E, rotates in the direction of the arrow e, in Fig. 2, while the machine progresses over the ground in the direction indicated by the arrow f. The cone surfaces of the several rotary cutters act as wedges which divide the grain and feed it laterally from the surface of the one cone toward the base of the next cone, to be gathered by the extremities or hooks c', c², as fast as they rotate. Such operation is represented in Fig. 3, the machine advancing toward the observer. In a similar manner, each helical cutter feeds the standing grain toward a successive cutter for the latter to seize, and the rotary cutters thereby perform a double function, namely, of dividing and feeding the grain, and also of severing the grain fed to them.

In Figs. 2, and 3, the hooks or extremities c², are about to enter and divide the grain, while the hooks c' are about to sever the grain fed to them; the cutter rotating upward on its advancing side.

In Figs. 5, and 6, the hooks or extremities c', are about to enter and divide the grain, while the hooks c² are about to sever the grain fed to them; the cutter rotating downward on its advancing side.

The helical surfaces of the rotary cutters assist as spiral feeders in performing the dividing and feeding functions of the cones.

The spiral succession effected in the relative arrangement of the rotary cutters upon the shaft E, affords a further advantage in that the hooks successively arrive at their positions for seizing in consecutive order, corresponding to the direction in which the grain is laterally fed.

I prefer to construct the knife edge a, as viewed in Fig. 2, or 6; with a curvature that is gradual at the extremity of the cutter, and of diminishing radius toward the hilt v. The differences in the radial distances between center of the shaft E, and the intersecting points of the rotary and stationary knives are thereby compensated for so as to equalize the resistance of shearing action at all points of rotation.

The direction of rotation given to the cutters B, in Fig. 6, possesses the advantage that when coming in contact with the ground or slight obstacles, the cutters will assist the progress of the machine. The stationary knives C, act as shoes or guards which principally rest upon the ground. The lower edges of said knives C, are continuously straight from the hub to the forward extremity thereof, both in Figs. 2, and 6. The bottom of the knife in Fig. 6, is seen to be straight in the inverted view, Fig. 10.

The rotary cutters B, should be of sufficient strength to resist an ordinary blow when encountering obstructions, and therefore require no teeth or fenders in front of them.

Having thus fully described my invention, what I claim and desire to secure by Letters Patent is:—

1. In a reaping or mowing machine a cutting apparatus, consisting in a series of conic shells divided in their surfaces to form cutters, located along a substantially horizontal axis, the apex of each conic shell lying within the base of an adjoining conic shell, so as to feed the stalks laterally from one shell to another into the rotary path of each cutting edge, when advancing through the grain or grass, substantially as described.

2. In a reaping or mowing machine, a rotary sickle moving on a substantially horizontal axis, provided with hooked knives to seize the grain, and means for feeding the grain laterally into said hooks when they advance as described.

3. In a reaping or mowing machine, a continuously rotating cutter composed of a series of knives on a common axis having their cutting edges in the form of conic spirals forming gathering hooks for the grain.

4. In a reaping or mowing machine, a rotating cutter provided with a helical cutting edge lying in the surface of a cone or other figure having differential diameters; the part of the cutting edge foremost in the course of rotation being that occupying the greatest radius, for the purpose described.

5. In a reaping or mowing machine, a continuously rotating cutter composed of a series of knives adjacently located on a common shaft, the surfaces of the said knives forming portions of conic shells extending around the said shaft, or nearly so, forming practically continuous lateral feeders for the grain, substantially as described.

6. In a reaping or mowing machine, a continuously rotating cutter composed of a series of knives on a common horizontal axis having cutting edges lying in the surfaces of cones or other convex figures such as described, the outer extremities of said knives overlapping the bases of adjacent knives, and projecting in the direction of rotation, and in combination therewith, stationary knives having cutting edges corresponding to the figures described by the rotation of the said rotary knives adapted to operate as set forth.

GERARD BEEKMAN.

Witnesses:
E. D. HOWLAND,
EUGENE LUCAS.